(12) United States Patent
Li et al.

(10) Patent No.: US 9,152,021 B2
(45) Date of Patent: Oct. 6, 2015

(54) LIGHT SOURCE, WAVELENGTH CONVERSION METHOD, WAVELENGTH CONVERSION DEVICE, AND SYSTEM FOR LIGHT SOURCE

(75) Inventors: Yi Li, Pleasanton, CA (US); Yi Yang, Shenzhen (CN)

(73) Assignee: APPOTRONICS LTD., Shenzhen (CN)

( * ) Notice: Subject to any disclaimer, the term of this patent is extended or adjusted under 35 U.S.C. 154(b) by 533 days.

(21) Appl. No.: 13/321,661

(22) PCT Filed: May 20, 2010

(86) PCT No.: PCT/CN2010/000710
§ 371 (c)(1), (2), (4) Date: Nov. 21, 2011

(87) PCT Pub. No.: WO2010/133090
PCT Pub. Date: Nov. 25, 2010

(65) Prior Publication Data
US 2012/0068630 A1    Mar. 22, 2012

(30) Foreign Application Priority Data

May 20, 2009    (CN) .......................... 2009 1 0107374

(51) Int. Cl.
*G03B 21/20* (2006.01)
*G03B 21/14* (2006.01)
(Continued)

(52) U.S. Cl.
CPC .............. *G03B 21/14* (2013.01); *F21S 48/115* (2013.01); *F21S 48/1131* (2013.01); *F21V 9/10* (2013.01);
(Continued)

(58) Field of Classification Search
CPC ...... G03B 21/204; G03B 21/14; G03B 21/28; G03B 21/208; G02F 1/133617; H05B 33/145; G02B 26/008; G02B 7/006; F21S 10/007; H04N 9/3114

USPC ................. 353/38, 84, 94; 362/293
See application file for complete search history.

(56) References Cited

U.S. PATENT DOCUMENTS 5,463,433 A * 10/1995 Koo ............................... 353/84
6,755,554 B2 * 6/2004 Ohmae et al. .................. 362/293
(Continued)

FOREIGN PATENT DOCUMENTS

CN    101221346    7/2008
JP    2004-341105    12/2004
(Continued)

OTHER PUBLICATIONS

International Search Report and Written Opinion in the parent PCT application No. PCT/CN2010/000710, dated Sep. 2, 2010.
(Continued)

*Primary Examiner* — Bao-Luan Le
(74) *Attorney, Agent, or Firm* — Chen Yoshimura LLP (57) ABSTRACT

A light source device includes a light emitting element and a wavelength conversion device. The wavelength conversion device includes a stationary member, a moveable carrier made of a transparent material carrying one or more wavelength conversion materials and moveable relative to the stationary member, and a stationary first filter. The first filter is fixed on the stationary member and disposed adjacent the moveable carrier. The excitation light from the light emitting element passes through the first filter and illuminates the wavelength conversion materials on the moveable carrier. The wavelength conversion materials convert the excitation light into converted light as the output of the light source device. The size of the first filter is smaller than the size of the moveable carrier and smaller than a carrying area of the moveable carrier that carries the wavelength conversion material. A wavelength conversion method using the wavelength conversion device is also described.

27 Claims, 3 Drawing Sheets

(51) Int. Cl.
*F21S 8/10* (2006.01)
*F21V 9/10* (2006.01)
*F21V 9/16* (2006.01)
*G02B 26/00* (2006.01)
*F21K 99/00* (2010.01)
*F21Y 101/02* (2006.01)
*G02F 1/23* (2006.01)
*G02F 1/355* (2006.01)

(52) U.S. Cl.
CPC .............. *F21V 9/16* (2013.01); *G02B 26/008* (2013.01); *G03B 21/204* (2013.01); *F21K 9/00* (2013.01); *F21Y 2101/02* (2013.01); *G02F 1/23* (2013.01); *G02F 1/355* (2013.01); *G02F 2201/38* (2013.01); *G02F 2202/046* (2013.01); *G02F 2202/36* (2013.01)

(56) References Cited

U.S. PATENT DOCUMENTS

| | | | | |
|---|---|---|---|---|
| 7,004,604 B2* | 2/2006 | Ohmae et al. | | 362/268 |
| 7,006,310 B2* | 2/2006 | Karube et al. | | 359/891 |
| 7,547,114 B2* | 6/2009 | Li et al. | | 362/231 |
| 7,651,243 B2* | 1/2010 | McGuire et al. | | 362/293 |
| 8,354,790 B2* | 1/2013 | Iwanaga | | 313/506 |
| 8,366,278 B2* | 2/2013 | Kurosaki et al. | | 353/98 |
| 2005/0046981 A1* | 3/2005 | Karube et al. | | 359/891 |
| 2005/0248690 A1* | 11/2005 | Kim | | 348/743 |
| 2006/0109428 A1* | 5/2006 | Liang | | 353/84 |
| 2007/0019408 A1* | 1/2007 | McGuire et al. | | 362/231 |
| 2009/0009730 A1* | 1/2009 | Destain | | 353/84 |
| 2009/0034284 A1* | 2/2009 | Li et al. | | 362/554 |
| 2009/0284148 A1* | 11/2009 | Iwanaga | | 313/506 |
| 2010/0328632 A1* | 12/2010 | Kurosaki et al. | | 353/98 |
| 2011/0249242 A1* | 10/2011 | Saitou et al. | | 353/98 |

FOREIGN PATENT DOCUMENTS

| | | | |
|---|---|---|---|
| JP | 2007-156270 | 6/2007 | |
| JP | 2008-52070 | 3/2008 | |
| WO | 2007/141688 | 12/2007 | |
| WO | WO 2009017992 A1 * | 2/2009 | ............ G03B 21/26 |

OTHER PUBLICATIONS

International Search Report in the parent PCT application No. PCT/CN2010/000710, dated Sep. 2, 2010.

English translation of Written Opinion in the parent PCT application No. PCT/CN2010/000710, dated Sep. 2, 2010.

* cited by examiner

LIGHT SOURCE, WAVELENGTH CONVERSION METHOD, WAVELENGTH CONVERSION DEVICE, AND SYSTEM FOR LIGHT SOURCE

BACKGROUND OF THE INVENTION

1. Field of the Invention

This invention relates to wavelength conversion methods and light source devices using the same. Such light sources are useful in lighting and projection system.

2. Description of the Related Art

An important aspect of light source technology development is enhancing the output brightness and power simultaneity. Taking as examples light sources for projection devices, headlights or illuminating lamps for transport devices such as vehicles, motorcycles, boats or airplanes, searchlight etc., conventional light sources use ultra high power (UHP) lamps for providing white light. A color conversion device such as multi-segmented color wheels are used to generate desired red, green and blue light.

With the development in solid-state light sources, in particular light emitting diode (LED), light source systems increasingly adopt solid-state light source as a light emitting source, to overcome the shortcomings of UHP lamps such as high driving voltage, and long waiting time when turning on/off. Other benefits of solid-state light sources include improved color effect of monochromatic light, enhanced color gamut, extended life of the light source system, and reduced power consummation.

An LED light source system typically uses a monochromatic LED and a wavelength conversion device having wavelength conversion materials to generate various colored light. The wavelength conversion materials may include phosphors, quantum dots, fluorescent dyes, nano light emitting materials, etc. The light conversion device may employ, for example, a color wheel that carries one or more types of phosphors. The excitation light produced by the LED is introduced onto the rotating color wheel, and the different wavelength conversion materials generate converted light of different colors. For example, in a typical three primary colors projection system, a blue light produced by a LED light source is introduced onto the rotating color wheel with multiple segments carrying a different wavelength conversion material to generate red, green, blue light sequentially.

Figure 1:
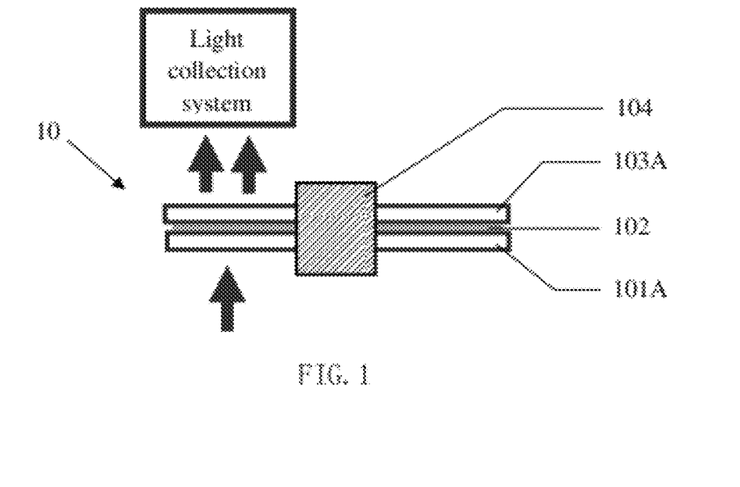
FIG. 1 schematically illustrates a color wheel of a conventional light source.

When the phosphor absorbs an excitation light, it emits a converted light with a Lambertian distribution in all directions. To improve efficiency in a wavelength conversion device 10, as shown in FIG. 1, a first filter 101A is provided on one side of the phosphor layer 102 (carried on a color wheel) for transmitting the excitation light and reflecting the converted light emitted by phosphor. Further, a second filter 103A is provided on the other side of the phosphor layer 102 for adjusting the light spectrum or the output angle of the output light. The second filter may have different segments with optical characters such as high-pass, low-pass, band-pass etc. that correspond to the converted light from different segments of the color wheel.

However, the cost of the filter, especially the first filter, is high. The cost of the filters can be about 60 percent to 80 percent of the total cost of the light conversion device.

SUMMARY OF THE INVENTION

The present invention is directed to a light source device and wavelength conversion method that substantially obviate one or more of the problems due to limitations and disadvantages of the related art.

An object of the present invention is to provide a light source device with high performance and low cost.

In order to overcome the problems of the conventional light source device mentioned above, an improved wavelength conversion device is described in the present disclosure. In the conventional light source device described above, the useful areas of the filters at any given moment are the areas illuminated by the excitation light or converted light, i.e., approximately the size of the excitation light spot or converted light spot, which are relatively small. Thus, in a wavelength conversion device according to embodiments of the present invention, one or both filters are separated from the color wheel and remain stationary relative to the excitation light, and are located adjacent the color wheel. As a result, the size (area) of the filters can be much smaller than the size of the color wheel, significantly reducing the cost of the filters.

In one aspect, the present invention provides a wavelength conversion method for a light source device, which includes: providing a wavelength conversion device comprising a moveable carrier which carries one or more wavelength conversion materials; directing an excitation light from a light emitting element onto the wavelength conversion device, wherein the size of a light spot of the excitation light illuminating on the moveable carrier is smaller than the moveable carrier, and wherein different segments of the moveable carrier are alternatingly illuminated by the light spot of the excitation light; directing a converted light generated by the wavelength conversion materials as an output light of the light source device; providing a stationary first filter fixedly disposed adjacent the moveable carrier and located on the optical path between the light emitting element and the moveable carrier, wherein the first filter transmits the excitation light from the light emitting element and reflects the converted light from the wavelength conversion materials, and wherein the first filter has a size that is smaller than the moveable carrier.

More specifically, the distance between the first filter and the moveable carrier is less than 20 percent of the diameter of a bounding circle of the light spot on the moveable carrier. The size of the first filter is smaller than a carrying area of the moveable carrier that carries the wavelength conversion materials. The moveable carrier may be a rotatable wheel, a moveable plate, a rotatable cylinder or the like. The wavelength conversion material may be phosphors, luminescent dyes, quantum dots, nano light emitting materials or the like. The wavelength conversion material may be mixed into a gel and adhered to one side of the moveable carrier. The wavelength conversion material may also be mixed into the material that forms the carrier. The wavelength conversion material may also be sandwiched between the moveable carrier and a transparent film. The transparent film or moveable carrier may be coated with anti-reflection films.

The wavelength conversion method further includes the step of providing a stationary second filter fixedly disposed adjacent the moveable carrier on the side opposite the first filter, to reflect the excitation light for increasing the utilization rate of the excitation light, or to restricts the output angle or spectral range of the converted light to change the characteristic of the output light. The distance between the second filter and the moveable carrier is less than 20 percent of the diameter of a bounding circle of the light spot on the moveable carrier.

In another aspect, the present invention provides a wavelength conversion device, which includes a stationary member; a moveable carrier moveably disposed relative to the stationary member, the moveable carrier being made of a transparent material and carrying one or more wavelength conversion materials; and a first filter fixedly disposed on the stationary member adjacent the moveable carrier, wherein the size of the first filter is smaller than the size of the moveable carrier.

More specifically, the size of the first filter is about 0.2 percent to 20 percent of the size of the moveable carrier. The moveable carrier may be a rotatable wheel, a moveable plate, a rotatable cylinder or the like. The wavelength conversion device further includes a second filter fixedly disposed on the stationary member adjacent the moveable carrier on a side opposite the first filter, wherein the size of the second filter is approximately the same as the size of the first filter. The first or second filter may be fixed onto the stationary member by a mounting structure such as a clamp. The mounting structure further includes an adjusting structure for adjusting the distance between the first or second filter and the moveable carrier. The distance between the first or second filter and the moveable carrier is preferably less than about 0.6 millimeters.

In another aspect, the present invention provides a light source device, which includes a light emitting element and a wavelength conversion device. The wavelength conversion device includes a stationary member; a moveable carrier moveably disposed relative to the stationary member, the moveable carrier being made of a transparent material and carrying one or more wavelength conversion materials; and a first filter fixedly disposed on the stationary member adjacent the moveable carrier, wherein the size of the first filter is smaller than the size of the moveable carrier. The wavelength conversion device further includes a second filter fixedly disposed on the stationary member adjacent the moveable carrier on a side opposite the first filter, wherein the size of the second filter is approximately the same as the size of the first filter. The first or second filter may be fixed onto the stationary member by a mounting structure such as a clamp. The distance between the first or second filter and the moveable carrier is preferably less than about 0.6 millimeters. The light emitting element may be a light emitting diode (LED).

In another aspect, the present invention provides a projection system having a light source device for alternatingly providing multiple individual monochromatic lights such as red, green and blue lights; a modulator for modulating the monochromatic lights for image generation; and projection optics for projecting the modulated monochromatic lights on a screen to generate a color image. The light source device includes a light emitting element and a wavelength conversion device. The wavelength conversion device includes a stationary member; a moveable carrier moveably disposed relative to the stationary member, the moveable carrier being made of a transparent material and carrying one or more wavelength conversion materials; and a first filter fixedly disposed on the stationary member adjacent the moveable carrier, wherein the size of the first filter is smaller than the moveable carrier. The wavelength conversion device further includes a second filter fixedly disposed on the stationary member adjacent the moveable carrier on a side opposite the first filter, wherein the size of the second filter is approximately the same as the size of the first filter. The distance between the first or second filter and the moveable carrier is preferably less than about 0.6 millimeters.

In another aspect, the present invention provides an illumination lamp, which includes a light collection system, a light source device and a control circuit. The light source device includes a light emitting element and a wavelength conversion device. The wavelength conversion device includes a stationary member; a moveable carrier moveably disposed relative to the stationary member, the moveable carrier being made of a transparent material and carrying one or more wavelength conversion materials. The control circuit drives the light emitting element and the moveable carrier using drive powers based on control signals. The light collection system collects the converted light form the wavelength conversion materials for projection in desired directions. The wavelength conversion device further includes a first filter fixedly disposed on the stationary member adjacent the moveable carrier, wherein the size of the first filter is smaller than the size of the moveable carrier. The wavelength conversion device further includes a second filter fixedly disposed on the stationary member adjacent the moveable carrier on a side opposite the first filter, wherein the size of the second filter is approximately the same as the size of the first filter.

In various embodiments of the present invention, the size of the first filter is reduced, thereby reducing the cost of the wavelength conversion device and the light source device. Further, the wavelength conversion device and the light source device have a simpler structure and are easy to implement.

It is to be understood that both the foregoing general description and the following detailed description are exemplary and explanatory and are intended to provide further explanation of the invention as claimed.

BRIEF DESCRIPTION OF THE DRAWINGS

Same or similar components in various drawings are labeled with same or similar symbols.

DETAILED DESCRIPTION OF THE PREFERRED EMBODIMENTS

Embodiments of the present invention are described in more detail below with reference to the drawings.

Figure 2:
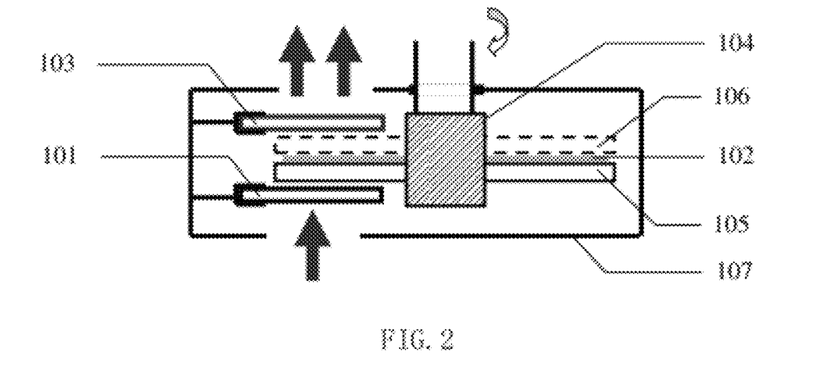
FIG. 2 schematically illustrates a light conversion device employing a color wheel according to a first embodiment of the present invention.
Figure 3:
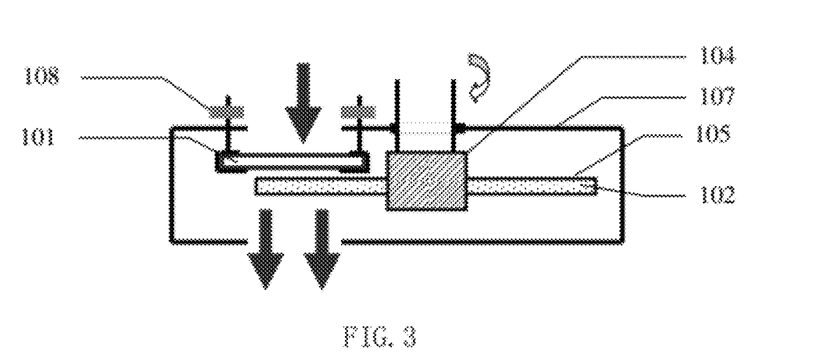
FIG. 3 schematically illustrates a light conversion device using a color wheel according to a second embodiment of the present invention.
Figure 8:
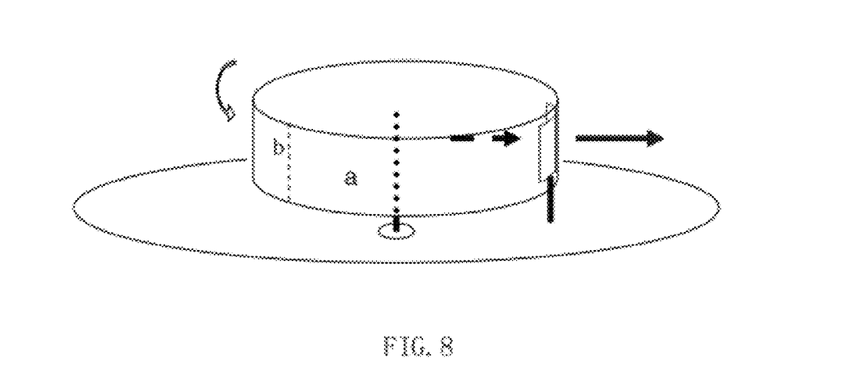
FIG. 8 illustrates a wavelength conversion device employing a rotatable cylinder according to a third embodiment of the present invention.
Figure 9:
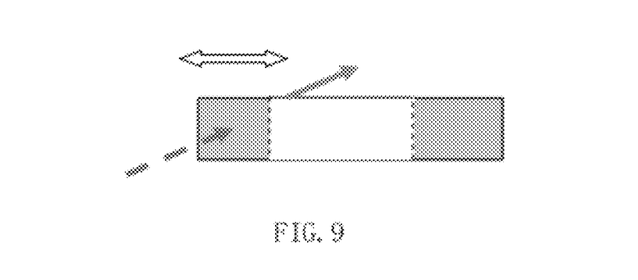
FIG. 9 illustrates a wavelength conversion device employing linear moveable plate according to a fourth embodiment of the present invention.

As described earlier, a conventional wavelength conversion method for a light source using includes the following steps:

Providing a wavelength conversion device having a moveable carrier that carries one or more wavelength conversion materials. The moveable carrier may be a rotating color wheel (as shown in FIGS. 1-3), a rotating cylinder (as shown in FIG. 8), or a moving plate (as shown in FIG. 9). In these figures, the hollow arrows depict the direction of movement of the moveable carrier. The wavelength conversion material may be phosphors, luminescent dyes, quantum dots, or nano light emitting materials, etc.

Introducing an excitation light from a light emitting element onto the wavelength conversion device. As the light spot of the excitation light directly illuminating on the moveable carrier is smaller than the size (area) of the moveable carrier that carries the wavelength conversion materials, different segments of the moveable carrier are alternately illuminated by the spot of the excitation light.

Directing the converted light generated by the wavelength conversion materials as an output light of the light source device.

Embodiments of the present invention improve upon the above described light conversion device and method by providing a stationary first filter disposed adjacent the moveable carrier and on the optical path between the light emitting element and the moveable carrier, the first filter transmitting the excitation light from the light emitting element and reflecting the converted light generated by the wavelength conversion materials. The excitation light passes through the first filter to illuminate the moveable carrier. Because the first filter is stationary and does not move with the moveable carrier, it is possible to use a first filter with a size (area) smaller than the size of a carrying area of the moveable carrier that carriers the wavelength conversion material.

FIG. 2 is across-sectional view illustrating a wavelength conversion device employing a rotating wheel according to a first embodiment of the present invention. The wavelength conversion device includes a stationary member 107 and a moveable carrier 105 which moves relative to the stationary member. The moveable carrier 105 is made of a transparent material and carries one or more wavelength conversion materials 102. The stationary member 107 may be a cover or housing for the moveable carrier 105, and a rotational shaft 104 of the moveable carrier 105 is mounted on the stationary member 107 via bearings or the like. The wavelength conversion materials 102 may be mixed into a gel and adhered to one side of the moveable carrier 105. Alternatively, the wavelength conversion materials 102 may be sandwiched between the moveable carrier 105 and a transparent plate 106 (such as a low cost glass). One or both sides of the transparent plate 106 and/or the moveable carrier 105 may be coated with an anti-reflection film (AR film) which is familiar to those skilled in the relevant art.

In this embodiment, the wavelength conversion device further includes a stationary first filter 101 fixed on the stationary member 107 and disposed adjacent the moveable carrier 105. The size of the first filter 101 is smaller than the size of the moveable carrier 105. If only a part of moveable carrier 105 is a carrying area that carries the wavelength conversion material 102, the size of the first filter is smaller than the size of the carrying area of the moveable carrier 105. As the light spot of the excitation light is typically about 0.2 percent to 20 percent of the size of the moveable carrier 105, the size of the first filter can be as small as about 0.2 percent to 20 percent of the area of the moveable carrier 105. Compared to the conventional light source device shown in FIG. 1, this design reduces the cost of the light source device.

In this embodiment of FIG. 2, the wavelength conversion device further includes a stationary second filter 103, for reflecting the excitation light of the light emitting element to increase the utilization rate of the excitation light, or for restricting the output angle or spectral range of the converted light to change the characteristic of the output light. The second filter 103 is fixed on the stationary member 107 and disposed adjacent the moveable carrier 105 on a side opposite the first filter 101. The distance between the second filter 103 and the moveable carrier 105 should be as small as possible. Preferably, to reduce cost, the shape and size of the second filter 103 are approximately the same as those of the first filter 101.

The first filter 101 and second filter 103 shown in FIG. 2 are fixed onto the stationary member 107 by a clamp or other suitable devices.

FIG. 3 shows a wavelength conversion device according to second embodiment of the present invention. In this embodiment, the wavelength conversion materials are mixed into the transparent material that forms the moveable carrier 105. For example, the moveable carrier 105 may be a glass substrate with phosphor mixed therein, forming a sufficiently strong moving body.

Figure 4:
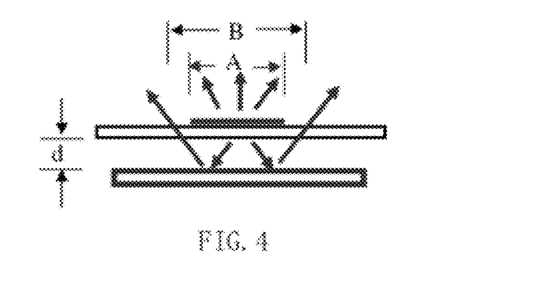
FIG. 4 illustrates the effect of the distance between the color wheel and the filter on the size of the light spot.

As it is desirable to reduce the size of the first filter 101 or second filter 103 as much as possible to reduce cost, the distance between the first or second filter 101, 103 and the moveable carrier 105 should be accurately controlled, especially when the light spot of the excitation light on the moveable carrier 105 is very small. Referring to FIG. 4, where d represents the distance between a filter (the first or second filter) and the moveable carrier above the filter. If the filter represents the first filter, which reflects the converted light form the wavelength conversion material, then after the reflection, the size of the light spot on the moveable carrier increases from its original size A to an expanded size B. If the filter represents the second filter, which reflects the unused excitation light from the wavelength conversion material, then A and B represent the original size of the light spot of the excitation light on the moveable carrier and its expanded size after the reflection. In both cases, the larger the distance d, the larger the expanded size B, and therefore the lower the brightness of the output light of the wavelength conversion device. To maintain a small light spot size as much as possible, the distance between the first or second filter 101, 103 and the moveable carrier 105 should be as small as possible, preferably less than 20% of the diameter of the bounding circle of the original light spot.

Figure 5:
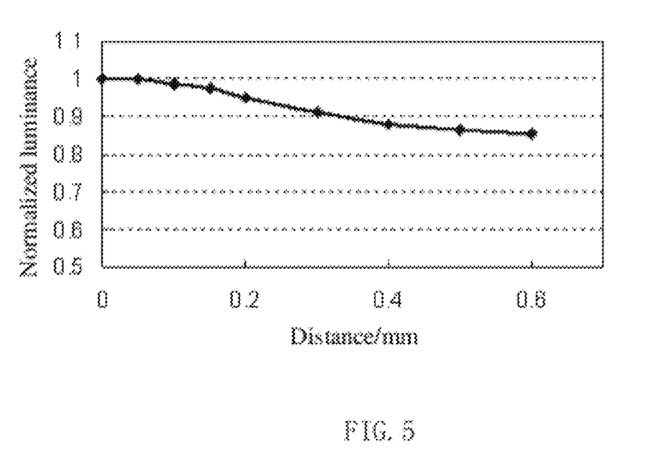
FIG. 5 illustrates the effect of the distance between the first filter and the color wheel of FIG. 3 on the brightness of the output light.

The curve in FIG. 5 illustrates the relationship between the brightness (luminance) of the output light of the wavelength conversion device and the distance d, when the original light spot of the excitation light is a square of about 4 mm in size. As seen in this figure, the brightness drops by about 10% when the distance d is about 0.3 mm.

Comparing the wavelength conversion device shown in FIG. 3 with that shown in FIG. 2, the omission of the transparent plate 106 helps to decrease the distance between the first or second filter 101, 103 and the moveable carrier 105. In addition, as shown in FIG. 3, the mounting structure that mounts the first filter 101 to the stationary member 107 may include a position adjustment structure 108 for adjusting the distance d between the first filter 101 and the moveable carrier 105. Although FIG. 3 does not show a second filter, a second filter similar to that shown in FIG. 2 may be provided in this embodiment, along with its own position adjustment structure. For an original light spot size of 4 mm square described above, the distance between the first or second filter and the moveable carrier is preferably less than 0.6 mm.

The wavelength conversion device of FIG. 2 or FIG. 3 may be employed in a light source device having a light emitting element. The first filter 101 is disposed between the light emitting element and the moveable carrier 105 and adjacent the moveable carrier. The light emitting element may be a solid state light source such as a light emitting diode (LED).

A rotatable cylinder may be employed in lieu of the rotatable color wheel as the moveable carrier in the wavelength conversion device according to embodiments of the present invention. In the example shown in FIG. 8, the cylindrical sidewall of the hollow rotatable cylinder includes at least two segments a and b. Each segment carries a different wavelength conversion material or no wavelength conversion material, so that they have different wavelength conversion characteristics. The light emitting element (not shown) is disposed inside the rotatable cylinder. A first filter is disposed inside the rotatable cylinder between the light emitting element and the cylinder and adjacent the interior surface of the cylindrical sidewall. The size of the first filter can be much smaller than the size of the cylindrical sidewall or the area of the segments carrying the wavelength conversion material. In an alternative embodiment, the sidewall of the rotatable cylinder is not segmented, and carries one wavelength conversion material or a mixture of more than one wavelength conversion materials.

A linearly moveable plate having multiple segments may be employed in lieu of the rotatable color wheel as the moveable carrier in the wavelength conversion device, as shown in FIG. 9. The structures that control the oscillation movement of the moveable plate can be easily implemented by those skilled in the relevant art. The first and second filters are not shown in FIG. 9

A projection system typically includes a light source system including a plurality of monochromatic light sources such as red, green, and blue light sources, a light modulation device for modulating the red, green and blue lights for image generation, and a lens system for projecting the modulated red, green and blue lights onto a screen to form images. The red, green, and blue lights may be guided by optical fiber bundles to a light combination element such as a prism, which combines the red, green, and blue light and directs the combined lights to the modulation device. The modulation device may be a micro-electro-mechanical system (MEMS) device, for example, a light modulator based on digital light processing (DLP) technology by Texas Instruments. An image signal processor of the projection system controls the multiple monochromatic light sources using drive signals, and outputs corresponding image data to the light modulator. For example, when the red light source is turned on to output a red light, the image signal processor transmits red image data to the light modulator (such as a digital micro-mirror device, DMD). Similarly, when the green or blue light source is turned on to output green or blue light, the image signal processor transmits green or blue image data to the light modulator. When the red, green, and blue light sources are simultaneously turned on, the image signal processor transmits gray image data to the light modulator. The light signal modulated by the light modulator is projected on the screen by the lens system. A light source device according to embodiments of the present invention may be employed in such a projection system to provide the monochromatic lights, such as red, green, and blue lights.

Figure 6:
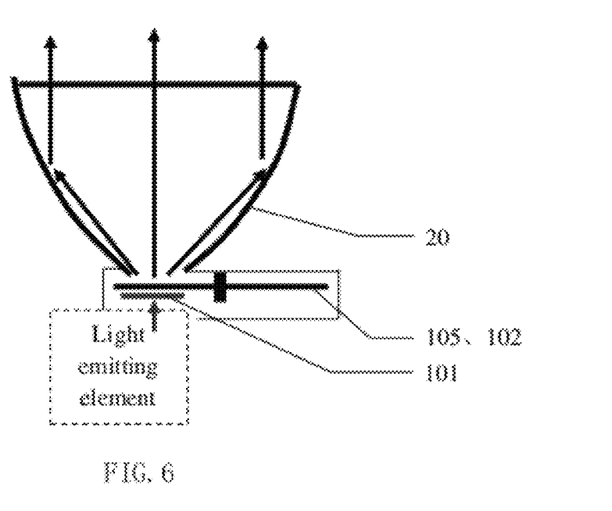
FIG. 6 illustrates a searchlight as an exemplary light source according to an embodiment of the present invention.

A light source device according to embodiments of the present invention may be used as a part of an illumination lamp which also includes a light collection system and a control circuit. The control circuit provides an output power based on a control command to drive the light emitting element and the movement of the moveable carrier of the light source device. The light collection system collects the converted light from the wavelength conversion material of the light source device and directs the output light in desired directions. FIG. 6 illustrates a searchlight which includes a reflector 20 as the light correction system. The control circuit may include a switch for a power supply. Using the light source devices according to embodiments of the present invention, the cost for high brightness, high power searchlight can be reduced.

Figure 7:
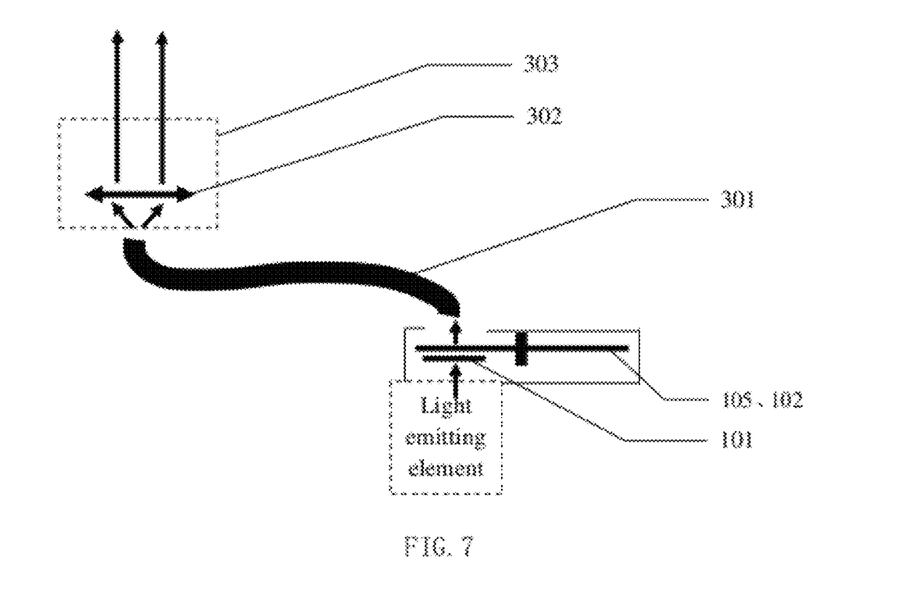
FIG. 7 illustrates an automobile headlight as another exemplary light source according to another embodiment of the present invention.

FIG. 7 shows an automobile headlight employing the light source device according to embodiments of the present invention. The automobile light includes an optical fiber bundle 301, a condensation lens 302, and a housing 303. The condensation lens 302 severs as the light collection member. Considering heat dissipation and compatibility with existing automobile headlights, the housing 303 can be a structure used in conventional automobile headlights. The condensation lens 302 is mounted in the housing 303, and the optical fiber bundle 301 guides the converted light from the wavelength conversion device to the condensation lens 302. The light source device including the light emitting element and the wavelength conversion device may be located in the automobile at a location convenient for heat dissipation.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A wavelength conversion method, used in a light source device for generating and an output light, comprising:
   providing a wavelength conversion device comprising a moveable carrier which carries one or more wavelength conversion materials;
   directing an excitation light from a light emitting element onto the wavelength conversion device, wherein a size of a light spot of the excitation light illuminating on the moveable carrier is smaller than a size of the moveable carrier, and wherein different segments of the moveable carrier are alternately illuminated by the light spot of the excitation light;
   directing a converted light generated by the wavelength conversion materials as the output light of the light source device;
   providing a stationary first filter fixedly disposed adjacent and parallel to the moveable carrier and located on an optical path between the light emitting element and the moveable carrier, wherein the first filter transmits the excitation light from the light emitting element and reflects the converted light from the wavelength conversion material, and wherein a size of the first filter is smaller than the size of the moveable carrier.

2. The method of claim 1, where a distance between parallel surfaces of the first filter and the moveable carrier is less than 20 percent of a diameter of a bounding circle of the light spot of the excitation light on the moveable carrier.

3. The method of claim 1, wherein the moveable carrier is a rotatable wheel, a moveable plate or a rotatable cylinder.

4. The method of claim 1, wherein the wavelength conversion materials are phosphors, luminescent dyes, quantum dots, or nano light emitting materials.

5. The method of claim 1, wherein the wavelength conversion material is mixed into a gel and adhered to one side of the moveable carrier, or mixed into a material that forms the moveable carrier.

6. The method of claim 1, wherein the wavelength conversion material is sandwiched between the moveable carrier and a transparent film.

7. The method of claim 6, further comprising coating an anti-reflection film on the transparent film or the moveable carrier.

8. The method of claim 1, further comprising:
providing a stationary second filter fixedly disposed adjacent the moveable carrier on a side opposite the first filter, the second filter reflecting the excitation light, or restricting an output angle or a spectral range of the converted light transmitted through the second filter.

9. The method of claim 8, wherein a distance between the second filter and the moveable carrier is less than 20 percent of a diameter of a bounding circle of the light spot of the excitation light on the moveable carrier.

10. The method of claim 1, wherein the size of the first filter is smaller than a size of a carrying area of the moveable carrier that carries the wavelength conversion materials.

11. A wavelength conversion device comprising:
a stationary member;
a moveable carrier moveably disposed relative to the stationary member, the moveable carrier being made of a transparent material and carrying one or more wavelength conversion materials, each wavelength conversion material absorbing an excitation light and emitting a converted light of a different color than the excitation light; and
a first filter fixedly disposed on the stationary member adjacent and parallel to the moveable carrier and located on an optical path between the light emitting element and the moveable carrier, wherein the first filter transmits the excitation light from the light emitting element and reflects the converted light from the wavelength conversion material, wherein a size of the first filter is smaller than a size of the moveable carrier.

12. The wavelength conversion device of claim 11, wherein the size of the first filter is about 0.2 percent to 20 percent of the size of the moveable carrier.

13. The wavelength conversion device of claim 11, wherein the moveable carrier is a rotatable wheel, a moveable plate or a rotatable cylinder.

14. The wavelength conversion device of claim 11, wherein the wavelength conversion materials are phosphors, luminescent dyes, quantum dots, or nano light emitting materials.

15. The wavelength conversion device of claim 11, further comprising: a second filter fixedly disposed on the stationary member adjacent the moveable carrier on a side opposite the first filter, wherein a size of the second filter is about the same as the size of the first filter.

16. The wavelength conversion device of claim 15, further comprising a mounting structure for fixing the first filter or the second filter onto the stationary member.

17. The wavelength conversion device of claim 16, wherein the mounting structure includes an adjusting structure for adjusting a distance between the first or second filter and the moveable carrier.

18. The wavelength conversion device of claim 15, wherein a distance between the first or second filter and the moveable carrier is less than about 0.6 mm.

19. A light source device comprising:
a light emitting element; and
a wavelength conversion device comprising:
a stationary member;
a moveable carrier moveably disposed relative to the stationary member, the moveable carrier being made of a transparent material and carrying one or more wavelength conversion materials, each wavelength conversion material absorbing an excitation light and emitting a converted light of a different color than the excitation light; and
a first filter fixedly disposed on the stationary member in an optical path between the light emitting element and the moveable carrier, the first filter being disposed adjacent and parallel to the moveable carrier, wherein the first filter transmits the excitation light from the light emitting element and reflects the converted light from the wavelength conversion material, wherein a size of the first filter is smaller than a size of the moveable carrier.

20. The light source device of claim 19, wherein the wavelength conversion device further comprises: a second filter fixedly disposed on the stationary member adjacent the moveable carrier on a side opposite the first filter, wherein a size of the second filter is about the same as the size of the first filter.

21. The light source device of claim 20, wherein the wavelength conversion device further comprises:
a mounting structure for fixing the first filter or the second filter onto the stationary member.

22. The light source device of claim 19, wherein a distance between the first or second filter and the moveable carrier is less than about 0.6 mm.

23. The light source device of claim 19, wherein the light emitting element is a light emitting diode (LED).

24. A projection system comprising:
a light source device for alternatingly providing multiple monochromatic lights including red, green and blue lights;
a modulator for modulating the red, green and blue lights; and
projection optics for projecting the modulated red, green and blue lights on a screen to generate a color image;
wherein the light source device comprises:
a light emitting element; and
a wavelength conversion device comprising:
a stationary member;
a moveable carrier moveably disposed relative to the stationary member, the moveable carrier being made of a transparent material and carrying one or more wavelength conversion materials, each wavelength conversion material absorbing an excitation light and emitting a converted light of a different color than the excitation light; and
a first filter fixedly disposed on the stationary member in an optical path between the light emitting element and the moveable carrier, the first filter being disposed adjacent and parallel to the moveable carrier, wherein the first filter transmits the excitation light from the light emitting element and reflects the converted light from the wavelength conversion material, where wherein a size of the first filter is smaller than a size of the moveable carrier.

25. The projection system of claim 24, wherein the wavelength conversion device further comprises: a second filter fixedly disposed on the stationary member adjacent the moveable carrier on a side opposite the first filter, wherein a size of the second filter is about the same as the size of the first filter.

26. The projection system of claim 25, wherein a distance between the first or second filter and the moveable carrier is less than about 0.6 mm.

27. An illumination lamp comprising:
a light collection system;
a light source device; and
a control circuit;

wherein the light source device comprises:
- a light emitting element; and
- a wavelength conversion device comprising:
  - a stationary member;
  - a moveable carrier moveably disposed relative to the stationary member, the moveable carrier being made of a transparent material and carrying one or more wavelength conversion materials, each wavelength conversion material absorbing an excitation light and emitting a converted light of a different color than the excitation light, wherein the control circuit drives the light emitting element and the moveable carrier using drive powers based on control signals; and
  - a first filter fixedly disposed on the stationary member in an optical path between the light emitting element and the moveable carrier, the first filter being disposed adjacent and parallel to the moveable carrier, wherein the first filter transmits the excitation light from the light emitting element and reflects the converted light from the wavelength conversion material, wherein a size of the first filter is smaller than a size of the moveable carrier, and,
- wherein the light collection system collects light form the wavelength conversion materials for projection in desired directions.

* * * * *